(12) United States Patent
Pritikin

(10) Patent No.: US 9,118,486 B2
(45) Date of Patent: Aug. 25, 2015

(54) REVOCATION OF PUBLIC KEY INFRASTRUCTURE SIGNATURES

(71) Applicant: Cisco Technology, Inc., San Jose, CA (US)

(72) Inventor: Max Pritikin, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 13/898,936

(22) Filed: May 21, 2013

(65) Prior Publication Data

US 2014/0351581 A1 Nov. 27, 2014

(51) Int. Cl.
*H04L 29/06* (2006.01)
*H04L 9/32* (2006.01)
*H04L 9/00* (2006.01)

(52) U.S. Cl.
CPC .............. *H04L 9/3268* (2013.01); *H04L 9/006* (2013.01); *H04L 9/3263* (2013.01); *H04L 63/0823* (2013.01)

(58) Field of Classification Search
CPC .......................... H04L 9/3263; H04L 63/0823
USPC ........................................................ 713/156
See application file for complete search history.

(56) References Cited

U.S. PATENT DOCUMENTS

| 5,261,002 | A | 11/1993 | Perlman et al. | |
|---|---|---|---|---|
| 5,699,431 | A | 12/1997 | Van Oorschot et al. | |
| 7,058,619 | B2 | 6/2006 | Wanish | |
| 7,500,100 | B1 | 3/2009 | Kobozev et al. | |
| 8,291,216 | B2 | 10/2012 | Adams et al. | |
| 8,301,880 | B2 | 10/2012 | Jennings et al. | |
| 8,347,082 | B2 | 1/2013 | Sato et al. | |
| 8,407,464 | B2 | 3/2013 | Salowey et al. | |
| 2002/0107814 | A1* | 8/2002 | Micali | 705/67 |
| 2007/0162742 | A1* | 7/2007 | Song et al. | 713/156 |
| 2010/0332397 | A1* | 12/2010 | Dare et al. | 705/50 |
| 2014/0156990 | A1* | 6/2014 | Dare et al. | 713/156 |

OTHER PUBLICATIONS

Brad Arkin, Inappropriate Use of Adobe Code Signing Certificate, Sep. 27, 2012, Adobe Systems Incorporated.

* cited by examiner

*Primary Examiner* — Arvin Eskandarnia
(74) *Attorney, Agent, or Firm* — Lempia Summerfield Katz LLC

(57) ABSTRACT

In one implementation, a public key infrastructure utilizes a two stage revocation process for a set of data. One stage authenticates or revokes the set of data based on the status of the digital signature and another stage authenticates or revokes the set of data based on the status of an individual signature by the digital certificate. For example, a digital certificate based is assigned a certificate number. A serial number is assigned for a signature for the set of data as signed by the digital certificate. A data transmission, data packet, or install package includes the set of data, the certificate number and the serial number. Therefore, individual instances of the signature may be revoked according to serial number.

20 Claims, 5 Drawing Sheets

US 9,118,486 B2

REVOCATION OF PUBLIC KEY INFRASTRUCTURE SIGNATURES

TECHNICAL FIELD

This disclosure relates in general to the field of public key infrastructures, or more particularly, to the revocation of signatures in public key infrastructure or another cryptographic or electronic signature technique.

BACKGROUND

A digital signature is a mathematical scheme for insuring the authenticity of a message or a document. A recipient of the message or document verifies the source using the digital signature. In addition, the digital signature may also be used to detect tampering of the data in transit. A digital signature is generated using private key material that is usually associated with a digital certificate.

A digital certificate may be created by a public key infrastructure (PKI), including a private key and a public key. The digital certificate is created by generating a digital signature over public key material and can be verified using the signer's public key. In order for the digital certificate system to be secure, the signer's private key must be kept secure. If the private key is leaked or otherwise compromised, even for a short period of time, perfect forgeries of digital signatures may be issued. An unauthorized user may gain access to the private key and make a copy of the private key, thus allowing unauthorized forgeries of digital signatures and digital certificates. Additionally, forged digital signatures may be created when an unauthorized user gains temporary control of a computer storing the private key. Even if the computer prevents unauthorized copies, the unauthorized user may instruct the computer to generate unauthorized digital signatures, including creation of digital certificates. Techniques have been devised for revoking forged copies of digital certificates but not for revoking digital signatures in general.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
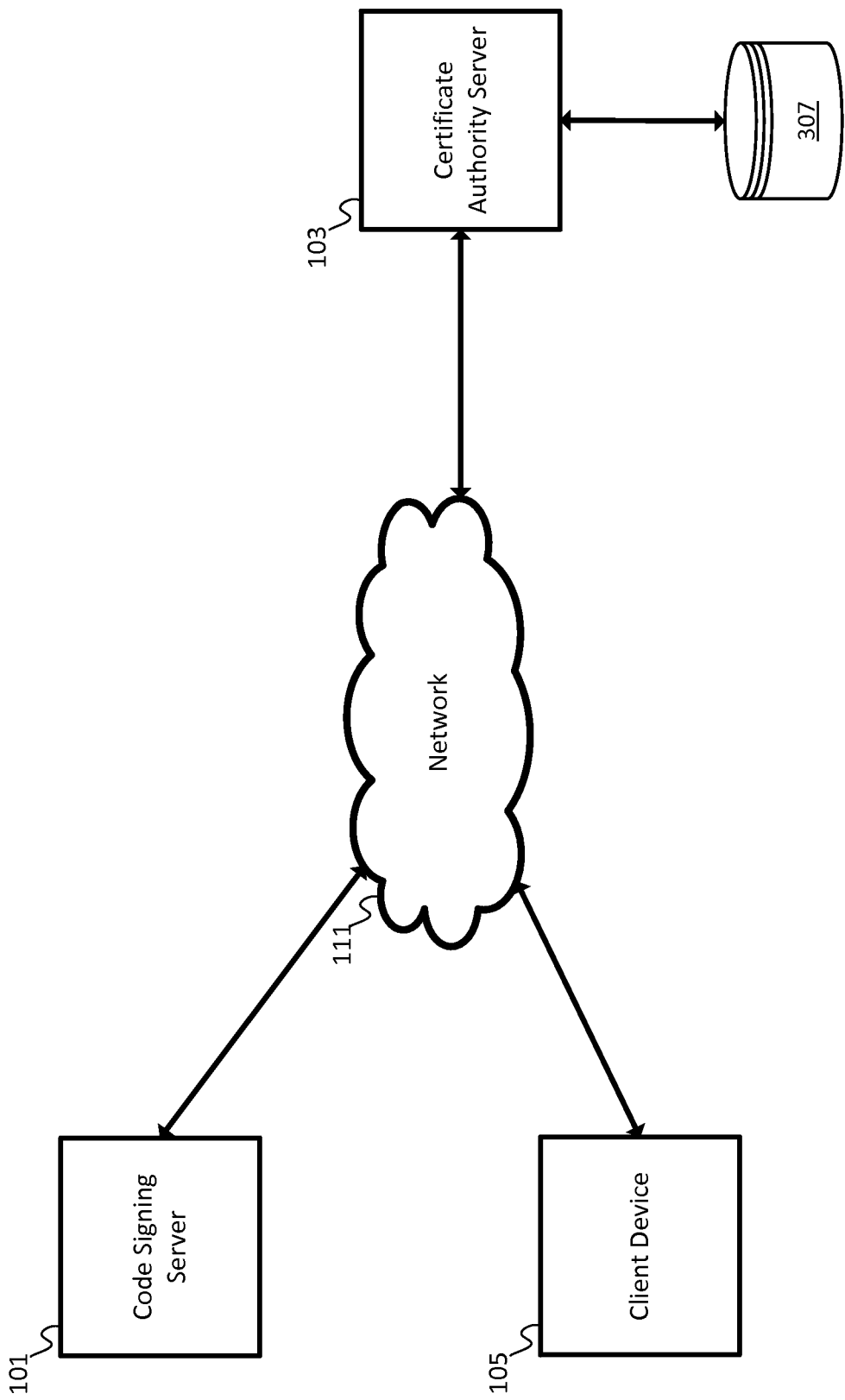
FIG. 1 illustrates an example system for the revocation of public key infrastructure signatures.

In one embodiment, a method includes receiving a digital certificate derived from a cryptographic key, wherein the digital certificate includes a certificate number assigned to the digital certificate, generating a signature for a set of data using the digital certificate, assigning, by a processor, a signature serial number to the signature for the set of data, and generating, by the processor, a data packet including the certificate number and the signature serial number.

In another embodiment, an apparatus includes at least a controller, a database, and a communication interface. The controller configured to assign a serial number to a signature of a digital certificate applied to authenticate a set of code. The digital certificate includes a certificate number. A database is configured to store a signature revocation flag associated with the serial number of the signature and the certificate number of the digital certificate. A communication interface is configured to receive an authentication request for the serial number of the signature and the certificate number of the digital certificate. The controller is configured to access the signature revocation flag associated with the serial number of the signature and the certificate number of the digital certificate in response to the authentication request.

Example Embodiments

Public key infrastructure (PKI) is the system through which digital certificates are generated, distributed, verified, and revoked. A digital certificate is a set of information (e.g., electronic document) that provides a form of identification for the creator of another set of data. The digital certificate may include a public key. The creator of the other set of data may be referred to as the certificate holder. The digital certificate guarantees the authenticity of the origin of the other set of data. The digital certificate is issued by a certification authority (CA). The CA may be a server or another computer.

PKI includes an asymmetric key algorithm in which two separate keys are assigned to a specific entity. One of the keys is a public key and is widely distributed. The other key is secret or private. The public key and the private key are mathematically linked. For example, the public key may be configured to lock or encrypt data, and the private key may be configured to unlock or decrypt the data. In one example, only the public key locks or encrypts data, and only the private key unlocks or decrypts the data. Thus, neither key performs both functions alone. The public key may be published without compromising security, while the private key must not be revealed to unauthorized parties.

The digital certificate may be a digital credential, a digital passport, or any set of information that binds authentication information to a public key that corresponds to a private key held by the entity named in the digital certificate.

Private keys may be compromised through unauthorized access or control of the holder of the private key. In one instance, the private key is stored in a hardware security module (HSM), which includes a cryptoprocessor or another device configured to prevent all access to removing, deleting, or copying the private key. Even the machine storing and managing the private key is prevented from full access to the private key.

The digital certificate indicates the entity named in the digital certificate has possession of the private key or alternatively, that the bearer of the private key is the named entity. The digital certificate signs one key to authenticate or guarantee the location of the other key. Similarly, the possessor of a private key may authenticate or guarantee the any set of data by the cryptographic generation of a signature coupled to the set of data. Example sets of data include a piece of software, an application, an electronic ticket, a digital music file, an audio book, an image, a movie, or any data file with an authenticated source.

The digital certificate data may include the name of the CA, the name of the certificate holder, a certificate number, an expiration date for the certificate, the public key of the certificate holder, and the digital signature of the CA. Other signed data sets may include only a subset, or none, of this information. The CA may also include a revocation database. The revocation database lists certificates and a state for each certificate. The revocation database may list certificates by certificate number. When a certificate is revoked, all signatures generated using the private key are simultaneously revoked.

Revocation of a digital certificate is effective in eradicating an unauthorized signature because no relying party will accept any signatures generated by the private key identified by the revoked digital certificate. However, in some instances, only some of the signatures may have been unauthorized. Thus, the certificate holder must obtain a new key pair (e.g., private and public), have the key pair certified by the certification authority, and re-sign and re-distribute all of the data signed with signatures that were properly issued as part of the process of revoking the unauthorized signatures.

The following embodiments include a signature serial number that is issued for each instance of a signature in addition to any serial number included within the data itself. A trusted signature database includes a list of signatures by signature serial number. The database may also include a list of certificates by certificate serial number. The database may list a signature state for each signature and a certificate state for each certificate. The states may be active, revoked, or another state. The signature serial numbers may be used to revoke only a sub-set of the signatures associated with a digital signature. The signature serial numbers may be used to revoke individual signatures even if the data itself does not include a serial number.

FIG. 1 illustrates an example system for the revocation of public key infrastructure signatures. The system includes a signing server or a code signing server 101, a certificate authority server 103, and a client device 105, each coupled with a network 111. The phrase "coupled with" includes directly connected to or indirectly connected through one or more intermediate components. Such intermediate components may include hardware and/or software-based components. The certification authority server 103 issues a digital certificate that is revocable based on the identity of the digital signature or a particular instance of a signature using the private key. Additional, different, or fewer components may be provided, such as the signing server 101 and the certification authority server 103 may be combined in a single server. Also, the signing server 101 and the certification authority server 103 may be another type of network-connected device such as a computer.

Figure 2:
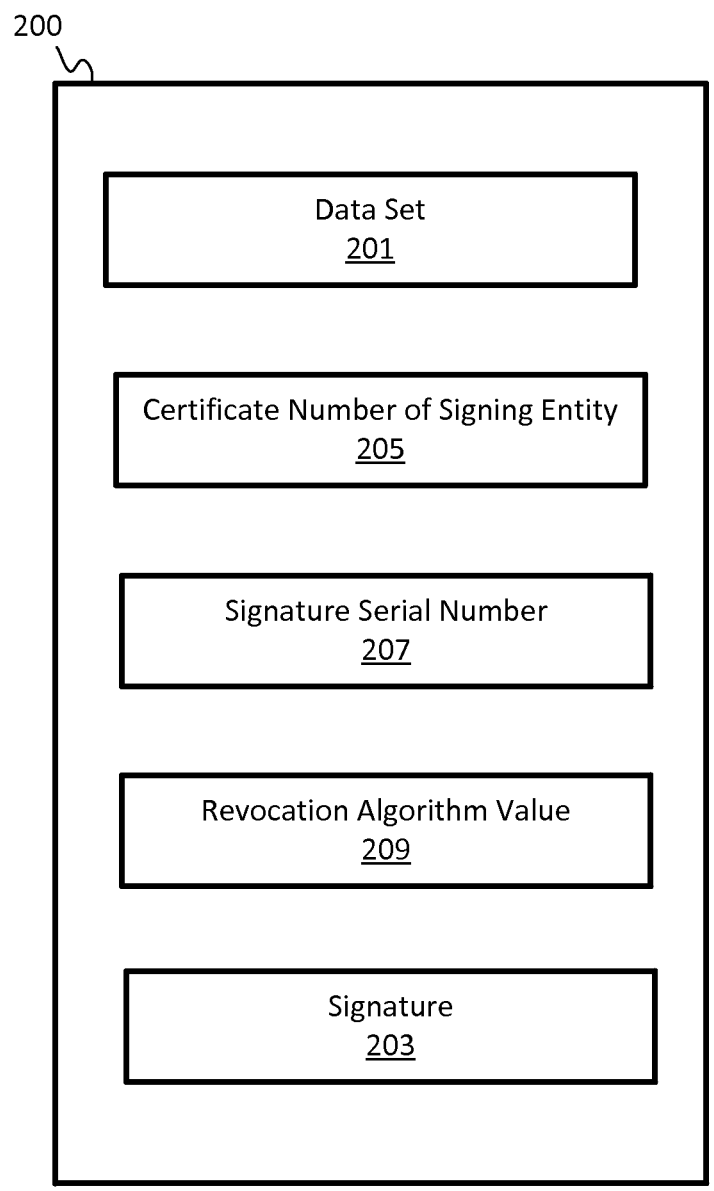
FIG. 2 illustrates an example signed data packet.

FIG. 2 illustrates an example signed data packet 200. The signed data packet 200 includes a data set 201, a signature 203, a certificate number of the signing entity 205, a signature serial number 207, and a revocation algorithm value 209.

The certification authority server 103, the signing server 101, or any bearer of a private key, signs signed data packet 200 using the private key or another cryptographic key. The certification authority server 103 certifies that a computer, a network device, a user or an enterprise possesses the private key indicated by a digital certificate. The certification authority server 103 is configured to assign the signing entity's certificate number 205 to the digital certificate. The signing entity's certificate number 205 may be a unique number assigned to the computer, the network device, the user or the enterprise. The signing entity's certificate number 205 may be derived from a media access control address of the computer. The signing entity's certificate number 205 may be derived from the name or address of the computer, the network device, the user or the enterprise. The signing entity's certificate number 205 may be created by a random number generator or the source.

The signing server 101 is configured to generate the signature 203 for the set of data 201 using the digital certificate. The signature 203 may be derived from a private key accessible by the signing server 101. The signing server 101 may have access to multiple private keys, and signing servers may have access to a single private key.

The signing server 101 is configured to assign the signature serial number 207 to the signature 203 for the set of data 201. The signature serial number 207 may be a hash of or other function of the signature. The serial number 207 is unique to every instance of a signature from the digital certificate. The serial number 207 may include multiple parts or a single part. The serial number 207 may include a first portion related to a date, such as a creation date, an expiration date, and/or an effective data for the signature. The serial number 207 may include a second portion related to the identity of the certification authority server 103 or the signing server 101. A signing entity (e.g., an enterprise, website, a domain, or a company) may include multiple signing servers, each identified by an identification value that is incorporated into the signature serial number 207. The signature serial number 207 may include a third portion that is sequentially assigned. The signature serial number 207 for the signature and the signing entity's certificate number 205 may be combined (e.g., concatenated into a single alphanumeric string).

The signing server 101 is configured generate a data packet including the certificate number 205 and the signature serial number 207. The data packet may be a packet of data defined under layer 3 of the OSI model (e.g., user datagram protocol, transmission control protocol, or another protocol) or a layer 2 frame. The data packet may include an executable application such as a mobile app or another type of software. The data packet may be any collection of data sent from one party to another with an authenticity guarantee.

The database 307 (e.g., trusted signature database) coupled with the signing server 101 may be configured to store a list or a range of valid signatures. The database 307 may be coupled directly to the signing server 101 or through the network 111. The database 307 is updated upon issuance of each instance of a signature. Alternatively, the database 307 may indicate that all instances of signatures for a digital certificate are valid until a particular signature should be revoked. In one example, the database 307 includes a list of signatures each associated with a revocation flag. The revocation flag indicates that the signature is revoked. The revocation flag may include an effective date and/or time for the revocation. In one example, the singing server 101 generates a log related to the generation of the signature. The log may include, for example, one or more of the authorization mechanism used, the results of authorization, the data signed, the reason for signing or other information. The signing server 101 may store the log in memory or in database 307.

The database 307 is queried based on a request received from a client device 105. The query may be initiated by the signing server 101, the certification authority server 103, or another device. The client device 105 is attempting to verify the set of data 201 signed with the digital certificate. The request includes at least the serial number 207 of the signature and may include the certificate number of the signing entity. When the database 307 indicates that the signature 203 is revoked, the certification authority server 103 generates a revocation message, which is sent to the client device 105. When the database 307 indicates that the signature 203 is not revoked, the certification authority server 103 generates a verification message, which is sent to the client device 105.

In one example, the revocation process may also have a second stage in succession or concurrently. The request may also include the signing entity's certificate number 205 of the digital certificate. When the database 307 indicates that the either the signing entity's certificate number 205 or the signature 203 is revoked, the certification authority server 103 generates a revocation message, which is sent to the client device 105. When the database 307 indicates that both the signing entity's certificate number 205 and the signature 203 are not revoked, the certification authority server 103 generates an authentication message, which is sent to the client device 105.

Figure 3:
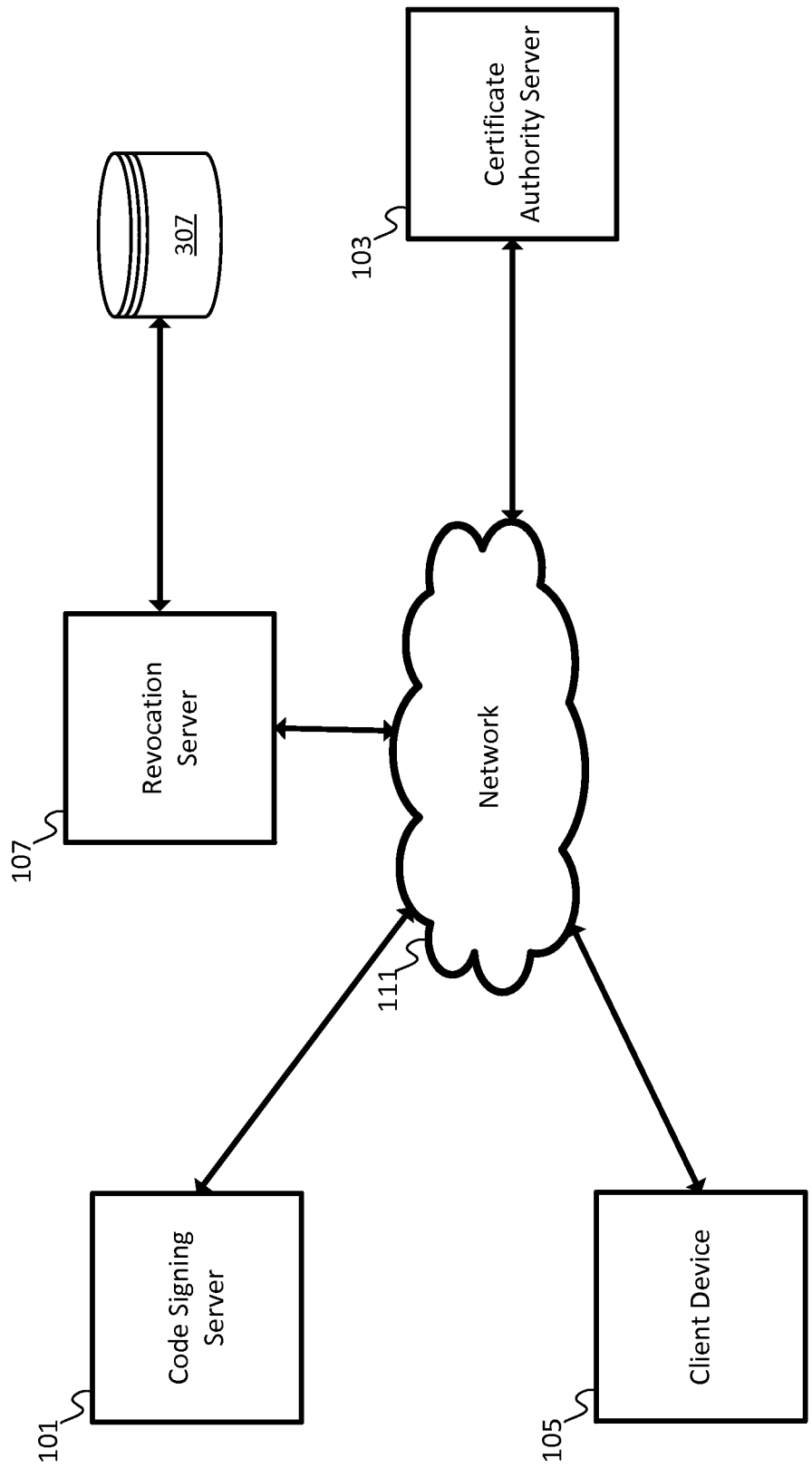
FIG. 3 illustrates another example system for the revocation of public key infrastructure signatures.

FIG. 3 illustrates another example system for the revocation of public key infrastructure signatures. In addition to the signing server 101, the certification authority server 103, and the client device 105, the system of FIG. 3 includes a revocation server 107. The revocation server 107 is configured to perform a revocation algorithm in response to a request from a client device 105. The request from the client device 105 is an attempt to authenticate a file, which may be a computer program or another licensed set of data. An operating system of the client device 105 initiates the request in response to the user attempting to open a file or an executable program.

The signed data packet 200, as shown in FIG. 2, includes a revocation algorithm value 209 indicative of the revocation algorithm. The revocation algorithm may include either a local revocation check or a remote revocation check. The revocation algorithm may check a list of valid signatures to determine whether the particular signature number has been revoked or check a list of invalid signatures to determine whether the particular signature number has been revoked. In addition, to checking signatures, the revocation algorithm may check for revoked digital certificates. The revocation algorithm may return a response of good, revoked, or unknown for the signature and/or for the digital certificate. When the revocation algorithm returns the response of valid, then the set of data 201 is verified as originating with the source that the signed data packet 200 purports to be from.

The remote revocation check occurs at the client device 105. The revocation server 107, in response to receiving the request from the client device 105, sends the list of revoked signatures to the client device 105. The client device 105 checks the signature for revoked status. The list of signatures may also include an expiration date and/or time. The remote server may request a new list of signatures when the current date and time is past the expiration date and time. The remote revocation check may check the status of the signature via a signature revocation list (SRL). The remote revocation check may also check the status of the entire digital certificate via a certificate revocation list (CRL).

The local revocation check occurs at the revocation server 107. The revocation server 107 receives the serial number of the digital signature from the client device 105 and checks the signature against a list of signatures in the database 307, which may be referred to as online signature status protocol (OSSP). The local revocation check may also check the status of the entire digital certificate via the online certificate status protocol (OCSP). The revocation server 107 may be an OCSP server. The OCSP server provides a real time mechanism to determine digital certificate status and signature status. Because the OCSP server is queried for each check, no expiration dates are needed for the signatures lists. In addition, bandwidth is reduced because the entire signature lists are not downloaded by the client device 105.

Other protocols may be used besides the SRL, OSSP, OCSP and CRL examples. The digital certificate may include a distribution point field including the revocation algorithm value 209 that specifies the revocation algorithm. Examples for the value include remote, local, OSSP, SRL, OCSP, CRL, or another protocol.

Figure 4:
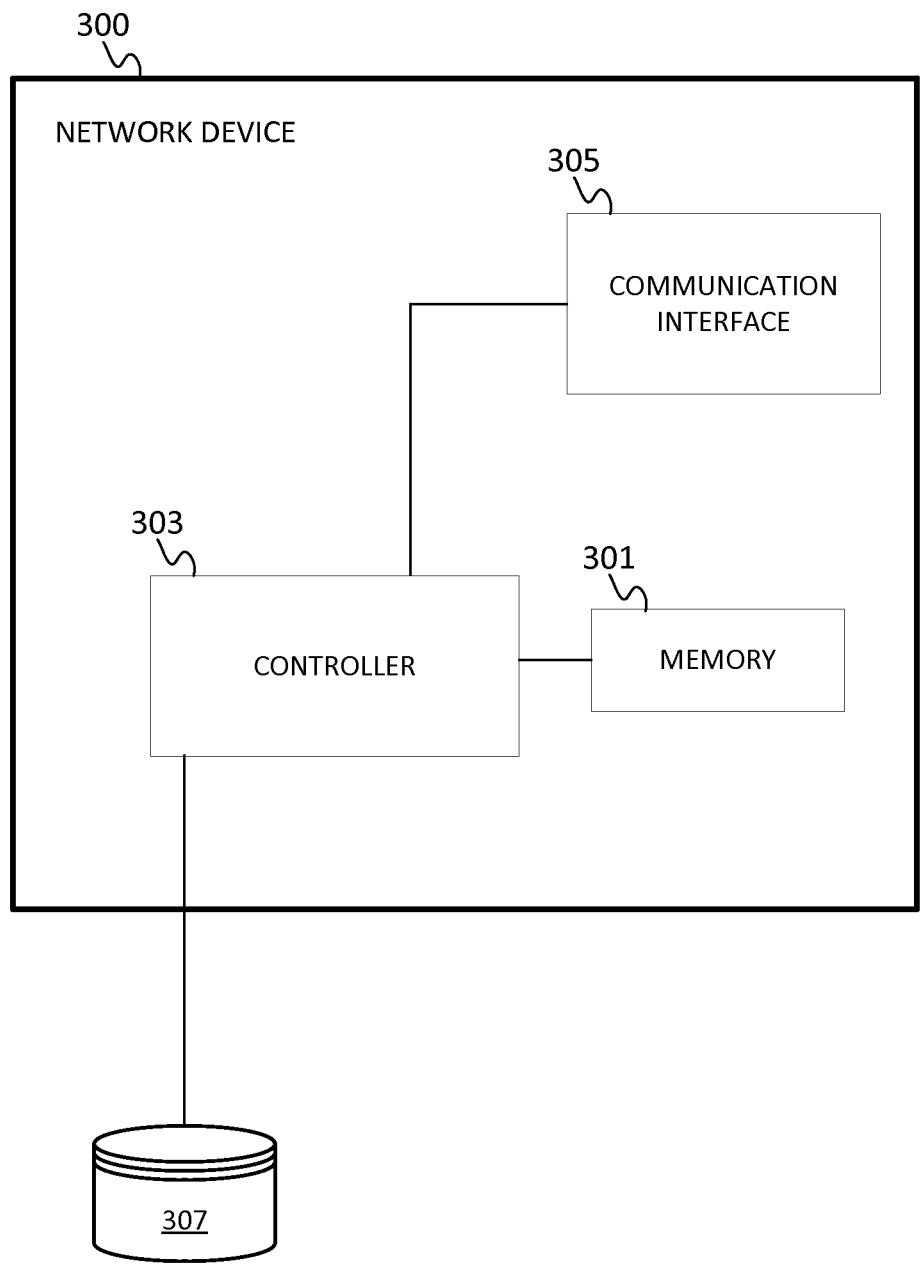
FIG. 4 illustrates an example network device of the systems of FIGS. 1 and 2.

FIG. 4 illustrates an example network device 300 for the networks of FIG. 1 of FIG. 2. The network device 300 includes at least a memory 301, a controller 303, and a communication interface 305. The network device 300 may perform functions described above with respect to the signing server 101. In one embodiment, the network device 300 also performs functions of the certification authority server 103 and/or the revocation server 107 as described above. Additional, different, or fewer components may be provided. Different network devices may have the same or different arrangement of components.

The controller 303 is configured to generate signatures using a digital certificate. The controller 303 assigns a signing entity's certificate number 205 and assigns a serial number 207 to each signature applied to the data being signed. The set of code can be any uniquely identifiable set of data. Uniquely identifiable sets of data include individually license software programs, electronic tickets, or media files. The controller 303 generates a data packet including the signing entity's certificate number 205, the serial number 207, and revocation algorithm data (e.g., revocation algorithm value 209) that specifies an algorithm for authenticating the signature. The algorithm may be a remote algorithm executed by the recipient of the data packet or a local algorithm executed by the controller 303 in response to a request from the recipient of the data packet.

In response to generation of each signature, an entry is added to database 307. The entry includes the signing entity's certificate number 205 and the signature serial number 207. The entry also includes a signature revocation flag associated with the signature serial number 207 and the signing entity's certificate number 205 of the digital certificate. The signature revocation flag initially has a positive value (e.g., good, authenticated, or a binary value of 1). However, the controller 303 is configured to switch the signature revocation flag to a revoked value based on a command received from an authorized administrator. The revocation may be made in response to an indication that the private key was compromised for a time and/or unauthorized signatures were issued.

The communication interface 305 is configured to receive an authentication request for the serial number 207 of the signature and/or the signing entity's certificate number 205 of the digital certificate. The authentication request may be generated at a remote device in response to an operating system, a browser, or another client attempting to open application coupled to the digital certificate.

The controller 303 queries the database 303 to identify whether the particular serial number is marked as revoked or not revoked. The controller 303 is configured to generate a revocation message for the digital certificate when the database lists the signing entity's certificate number as revoked and generate a revocation message for the signature when the database lists the serial number as revoked.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

Figure 5:
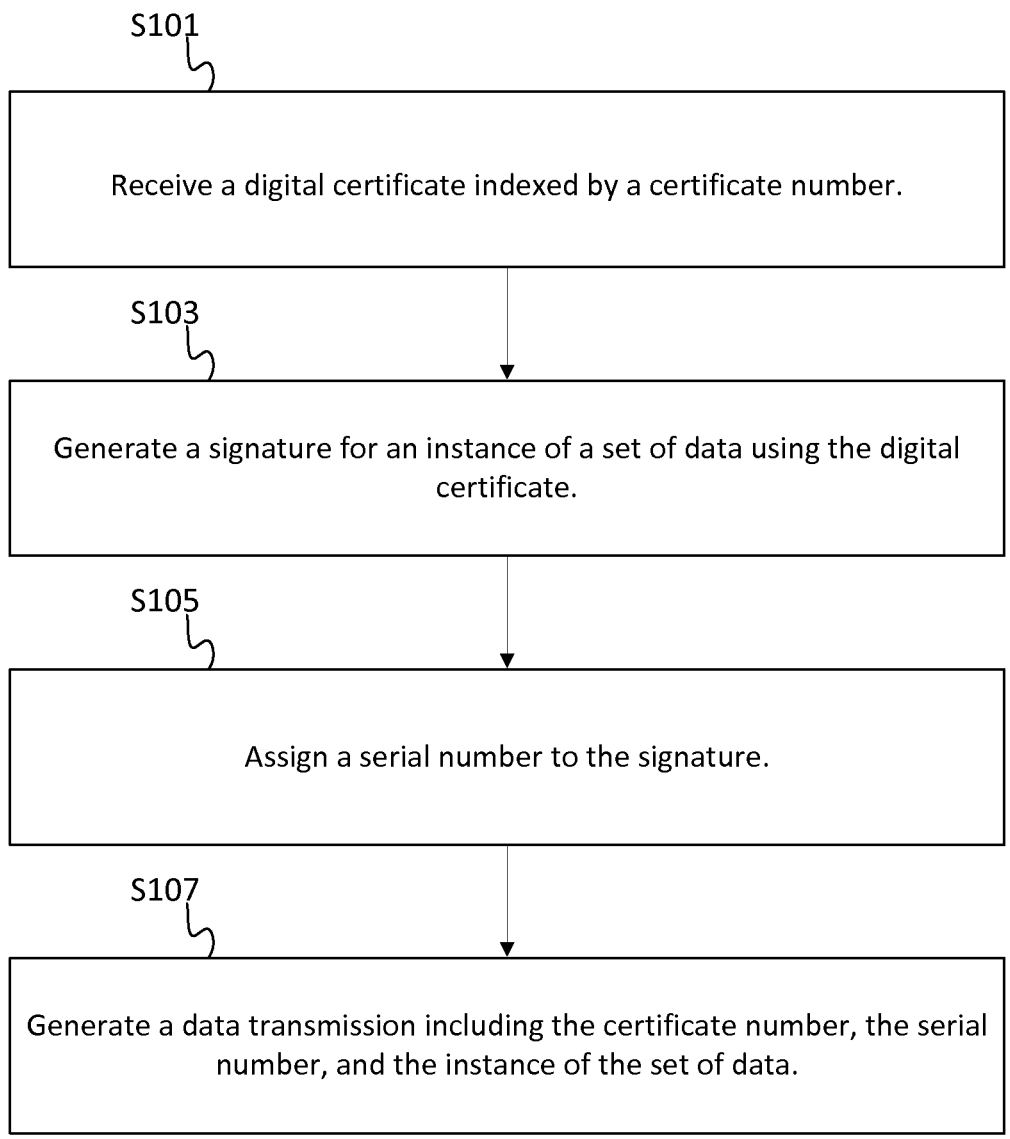
FIG. 5 illustrates an example flowchart for the revocation of public key infrastructure signatures.

FIG. 5 illustrates an example flowchart for propagating identity information for Internet services. The acts in FIG. 5 may be performed by the network device 101 or another device such as a single device acting as a signing server and a revocation server, which may be referred to in the alternative using the term controller. Additional, different, or fewer acts may be provided. The acts are performed in the order shown or other orders. The acts may also be repeated.

At act S101, the controller receives a digital certificate that identifies an author of a set of data based on a private key. The private key may bind information of the author (e.g., the name or address of a person or an organization). The digital certificate is indexed by a certificate number. The certificate number may be stored in a trusted signature database accessible by the controller.

At act S103, the controller generates a signature for an instance of the set of data using the digital certificate. The instance of the set of data may be an authorization statement that provides access to a resource, a ticket that may be printed and scanned for entry into a concert, a sporting event or another event, a boarding pass at an airport or other more of transportation, an audio book, an image from the Hubble telescope, a music file, a program executable, or footage from a security camera.

At S105, the controller assigns a serial number to the signature for the instance of the set of data. The serial number may be sequential. That is, the first instance of a signature for the digital certificate is number one, the second instance is number two, and so forth. Alternatively, the serial number may be tied to the exact date, hour, minute, second, and/or smaller time interval that the serial number was generated, insuring uniqueness among the signatures. The serial number may be generated using a random number generator and logged in memory to prevent duplicates. The serial number may be a combination of any of these or other techniques.

The signing entity's certificate number may be stored in a trusted signature database accessible by the controller and may be associated with the signature serial number. The trusted signature database may include a revocation flag that identifies whether each instance of signature from the digital certificate has been revoked or not. A date range, time range, sequential range, or individual instances of the signatures may be revoked when it becomes known or likely that the private key or digital certificate was compromised or subject to unauthorized use. The controller is configured to change the state of the revocation flag from authentic to revoked in response to data indicative of unauthorized use.

At S107, the controller generates a data transmission including the signing entity's certificate number, the serial number, and the instance of the set of licensed data. The data transmission may be a download of the set of licensed data. For example, the download may be a purchase of a software program, media file, electronic ticket or another purchase. The data transmission may be made by email, file transfer protocol, hypertext transfer protocol, secure hypertext transfer protocol, or another method.

The recipient of the set of data generates a request to verify the digital certificate and/or the signature. The controller receives the request and queries the digital signature database based on the request. The controller sends data indicative of the revocation flag to the recipient of the set of data. Therefore, individual instances of signatures may be revoked without re-issuing and re-distributing all signature instances signed with the digital certificate.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memory 301 and the database 307 are examples of computer readable media or non-transitory computer readable media. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
receiving a digital certificate derived from a cryptographic key, wherein the digital certificate includes a certificate number assigned to the digital certificate;
generating a signature for a set of data using the digital certificate;
assigning, by a processor, a signature serial number to the signature for the set of data; and
generating, by the processor, a data packet including the certificate number and the signature serial number.

2. The method of claim 1, further comprising:
storing the signature serial number in a trusted signature database.

3. The method of claim 2, further comprising:
receiving an instruction to revoke the signature; and
appending a revocation flag for the signature serial number in the trusted signature database.

4. The method of claim 3, further comprising:
receiving a request for authentication of the signature;
querying the trusted signature database in response to the request for authentication of the signature; and
generating a response to the request for authentication based on the revocation flag from the trusted signature database.

5. The method of claim 1, further comprising:
receiving a request for authentication of the signature from a remote server, wherein the request for authentication includes the signature serial number and the certificate number; and
querying a trusted signature database in response to the request for authentication of the signature using the serial number.

6. The method of claim 5, further comprising:
generating a revocation message for the digital certificate when the trusted signature database lists the certificate number as revoked; and
generating a revocation message for the signature when the trusted signature database lists the serial number as revoked.

7. The method of claim 1, wherein the data packet includes data indicative of an algorithm for verifying the signature.

8. The method of claim 1, wherein the data indicative of the algorithm for authenticating the signature indicates a procedure performed by a remote server.

9. The method of claim 1, wherein the data indicative of the algorithm for authenticating the signature indicates that the authentication is performed by a database local to the processor.

10. The method of claim 1, wherein the set of data is an executable application.

11. The method of claim 1, wherein the set of data is an electronic ticket file, a photograph file, a music file, or an executable program.

12. An apparatus comprising:
a controller configured to assign a serial number to a signature of a digital certificate applied to authenticate a set of code, wherein the digital certificate includes a certificate number;
a database configured to store a signature revocation flag associated with the serial number of the signature and the certificate number of the digital certificate; and
a communication interface configured to receive an authentication request for the serial number of the signature and the certificate number of the digital certificate,
wherein the controller is configured to access the signature revocation flag associated with the serial number of the signature and the certificate number of the digital certificate in response to the authentication request.

13. The apparatus of claim 12, wherein the signature of the digital certificate is generated using a private key of a user of the apparatus.

14. The apparatus of claim 12, wherein the communication interface is configured to receive an instruction to revoke the signature from a certificate holder server, and the controller is configured to generate the signature revocation flag for the serial number in the database in response to the instruction to revoke the signature.

15. The apparatus of claim 12, wherein the database is configured to store a certificate revocation flag associated with the certificate number of the digital certificate; and
   wherein the controller is configured to generate a revocation message for the digital certificate when the database lists the certificate number as revoked and generate a revocation message for the signature when the database lists the serial number as revoked.

16. The apparatus of claim 12, wherein the controller is configured to generate a data packet includes the authenticated set of code and revocation algorithm data that specifies an algorithm for checking the revocation of the signature.

17. The apparatus of claim 12, wherein the set of code is an executable application or a media file.

18. A non-transitory computer readable medium including instructions that when executed by a processor are operable to:
   receive a data packet including a digital certificate that identifies a signer of a set of data based on a cryptographic key and including a signature for an instance of the set of data using the digital certificate, wherein the digital certificate is indexed by a certificate number and the signature is assigned a serial number for the instance of the set of data; and generate a request for verification of revocation status including the certificate number of the digital certificate and the serial number of the signature for the instance of the set of data.

19. The non-transitory computer readable medium of claim 18, wherein the data packets includes a revocation algorithm value that indicates either a local revocation algorithm or a remote revocation algorithm.

20. The non-transitory computer readable medium of claim 19, wherein the set of data is a software program or a media file.

\* \* \* \* \*